(12) United States Patent
Lin et al.

(10) Patent No.: US 9,048,496 B2
(45) Date of Patent: Jun. 2, 2015

(54) SURFACE TREATMENT OF ELECTROCHEMICALLY ACTIVE MATERIALS FOR RECHARGEABLE CELLS

(71) Applicant: Leyden Energy, Fremont, CA (US)

(72) Inventors: Tzu-Yuan Lin, San Jose, CA (US); Anthony Lin Chern, Mountain View, CA (US); Konstantin Tikhonov, Pleasanton, CA (US)

(73) Assignee: A123 Systems LLC, Waltham, MA (US)

( * ) Notice: Subject to any disclaimer, the term of this patent is extended or adjusted under 35 U.S.C. 154(b) by 26 days.

(21) Appl. No.: 13/788,750

(22) Filed: Mar. 7, 2013

(65) Prior Publication Data

US 2013/0236784 A1   Sep. 12, 2013

Related U.S. Application Data

(60) Provisional application No. 61/608,048, filed on Mar. 7, 2012.

(51) Int. Cl.
| | | |
|---|---|---|
| *H01M 4/60* | (2006.01) | |
| *H01M 4/62* | (2006.01) | |
| *H01M 4/04* | (2006.01) | |
| *H01M 4/13* | (2010.01) | |
| *H01M 4/139* | (2010.01) | |
| *H01M 4/36* | (2006.01) | |
| *H01M 10/0525* | (2010.01) | |

(52) U.S. Cl.
CPC .............. *H01M 4/62* (2013.01); *H01M 4/0402* (2013.01); *H01M 4/13* (2013.01); *H01M 4/139* (2013.01); *Y02E 60/122* (2013.01); *H01M 4/366* (2013.01); *H01M 4/625* (2013.01); *H01M 10/0525* (2013.01)

(58) Field of Classification Search
CPC ...... H01M 4/0402; H01M 4/13; H01M 4/139
USPC .......................................................... 429/212
See application file for complete search history.

(56) References Cited

U.S. PATENT DOCUMENTS 4,486,377 A * 12/1984 Lucchesi et al. .............. 264/510
7,632,317 B2   12/2009 Belharouak et al.

(Continued)

FOREIGN PATENT DOCUMENTS

| CN | 101764207 | 6/2010 | | |
|---|---|---|---|---|
| WO | WO/2010/040516 | * | 4/2010 | ............. C01G 23/00 |
| WO | WO2012013685 | | 2/2012 | |

*Primary Examiner* — Muhammad Siddiquee
(74) *Attorney, Agent, or Firm* — Alleman Hall McCoy Russell & Tuttle LLP

(57) ABSTRACT

Provided herein are methods for processing electrochemically active materials and resulting active material structures for use in rechargeable batteries. The resulting active materials structures include carbon containing coatings that partially or completely cover the surface of the active material structures. In a typical embodiment, the method includes providing a solution of carbon containing precursor in a solvent, dispersing electrochemically active material in the solution to form a mixture, removing the solvent from the mixture to form electrochemically active material coated with the carbon containing precursor, and heating the electrochemically active material coated with the carbon containing precursor in an inert atmosphere at a temperature sufficient to at least partially convert the carbon containing precursor into a carbon coating. Also provided are an electrochemically active material prepared according to the methods described herein, as well as an electrode and a rechargeable electrochemical cell, each containing such electrochemically active material.

25 Claims, 11 Drawing Sheets

(56) References Cited

U.S. PATENT DOCUMENTS

| | | |
|---|---|---|
| 8,357,468 B2 | 1/2013 | Exnar et al. |
| 2008/0081258 A1* | 4/2008 | Kim et al. .................... 429/209 |
| 2011/0111294 A1* | 5/2011 | Lopez et al. ................. 429/217 |
| 2011/0217593 A1* | 9/2011 | Dollinger et al. .......... 429/231.1 |
| 2012/0049126 A1 | 3/2012 | Park et al. |
| 2012/0251886 A1* | 10/2012 | Yushin et al. .............. 429/231.5 |
| 2013/0065126 A1* | 3/2013 | Caldwell et al. .............. 429/212 |

* cited by examiner

SURFACE TREATMENT OF ELECTROCHEMICALLY ACTIVE MATERIALS FOR RECHARGEABLE CELLS

CROSS-REFERENCE TO RELATED APPLICATION

This application claims the benefit of priority to U.S. Provisional Application No. 61/608,048, titled "SURFACE TREATMENT OF ELECTROCHEMICALLY ACTIVE MATERIALS FOR RECHARGEABLE CELLS," filed Mar. 7, 2012, all of which is incorporated herein by this reference.

INTRODUCTION

Rechargeable cells may be fabricated using various electrochemically active materials capable of capturing and releasing lithium ions during cell cycling. An electrochemically active material is typically positioned on an electrode and is brought in contact with an electrolyte used to transfer charge carrying ions between the two electrodes. A substantial voltage gradient is often present at the interface between the active material and electrolyte during cycling. The voltage gradient depends, at least initially, on the active material used, cycling rates, electrolyte composition, and other related factors. This voltage gradient, coupled with catalytic properties of the active material, may cause decomposition and/or reduction of electrolyte components, thereby causing gas generation. This process may also cause an increase in electronic resistance of the cell. Both gas evolution and resistance increase may be undesirable.

Many electrochemically active materials are often fabricated as small particles, e.g., in a powder form, and are later bound to a conductive substrate to form an electrode. These particles should be electronically connected to the substrate in order to contribute to the storage capacity. Particles that are not in direct contact with the substrate need to be interconnected with the substrate by other particles and other components within the electrode layer. As such, contact resistance and particle conductivity are both important to ensure conductive electrodes and high charge and discharge rate capabilities.

Carbon-based materials may be used as conductive additives and protective materials. Carbon-based materials have relatively high conductivity in comparison to other electrode materials. Furthermore, catalytic activity of carbon-based materials is generally lower than that of many high capacity active materials. To provide such beneficial characteristics to electrodes, carbon-based materials may be integrated into the electrodes, and more specifically, may be electrically coupled with electrochemically active materials, and may to a certain extent, coat the active materials. At the same time, carbon-based materials may be introduced in particular amounts and in a particular manner to avoid negative interference with active material performance and to ensure the above listed characteristics. For example, excessive amounts or certain types of carbon-based materials may obstruct diffusion of charge carrying ions, and therefore reduce the rate performance of some electrochemically active materials.

Existing methods for introducing carbon-based materials into electrode structures may involve complex processes and may be limited to certain active materials. For example, sol-gel carbon coating methods are applicable only to active materials that can be synthesized using sol-gel techniques. Chemical Vapor Deposition (CVD) and spray pyrolysis techniques are expensive and generally cannot be used or integrated into battery manufacturing because of excessive costs, complexities, and scale up difficulties. Furthermore, coatings produced by such methods may be weak and separate from active material particles during active material handling and electrode fabrication. Powder blending and ball-milling techniques may not result in adequate surface coating of the active material particles resulting in poor performance.

SUMMARY

Provided herein are methods for processing electrochemically active materials and resulting active material structures for use in rechargeable batteries. The resulting active materials structures include carbon containing coatings that partially or completely cover the surface of the active material structures. In certain embodiments, one or more initial carbon containing precursors are only partially carbonized, resulting in a coating that includes multiple materials and, in certain embodiments, layers. Partial carbonization may be achieved by limiting the temperature and time during the carbonization process. These process parameters are specific to carbon containing precursors, active materials, processing set-ups and other parameters. A partially carbonized coating may have better adhesion to active material particles and/or the binder. Also, a partially carbonized coating may provide better ionic mobility than a fully carbonized coating.

A carbon containing coating created in accordance with techniques described herein may improve rate capabilities of the resulting materials and may eliminate or reduce the catalytic activity of the active materials. Furthermore, the rate capability may be improved due to a higher conductivity of the carbon containing coating. As such, an electrode produced with carbon-coated active materials may have higher rate capabilities when compared to a similar electrode produced with the same but uncoated active material. The carbon containing coating acts as a conductor between active material structures and other components within the electrode layer. A carbon-containing coating may also help to reduce gas evolution in a cell due to a generally lower level of catalytic activity of the carbon relative to active materials. Such active materials include, but are not limited to, metal oxides and mixed metal oxides of nickel, manganese, titanium, and cobalt. These materials may catalyze oxidation or reduction of various electrolyte components, such as carbonates.

In one aspect of the embodiments herein, a method is provided for processing an electrochemically active material for use in a rechargeable cell, including providing a solution of a solvent and a carbon containing precursor, dispersing the electrochemically active material in the solution to form a mixture, removing the solvent from the mixture to form the electrochemically active material coated with the carbon containing precursor, and heating the electrochemically active material coated with the carbon containing precursor in an inert atmosphere at a temperature sufficient to at least partially convert the carbon containing precursor into a carbon coating.

In certain embodiments, the average particle size of the electrochemically active material (in the particle's principal dimension) is less than about 1 micrometer. In other embodiments, the average particle size is less than about 5 micrometers or less than about 10 micrometers. The weight ratio of carbon in the carbon containing precursor to the total amount of electrochemically active material in the mixture may be insufficient, in certain implementations, to completely cover the electrochemically active material with the carbon coating. In other implementations, this weight ratio is sufficient to completely cover the electrochemically active material with the carbon coating. The carbon containing precursor may have a molecular weight of less than about 1000 g/mol in some cases. The carbon containing precursor may be a water-soluble polymer. The carbon containing precursor may include a carbohydrate, and in certain instances the carbohydrate may include one or more materials selected from the group consisting of sucrose, glucose and fructose. In other cases, the carbon containing precursor is selected from the group consisting of fatty acids, glycerol esters, and polycarboxylic acids. In some embodiments, the solvent used to prepare the solution may include one or more solvents from the group consisting of water, N-Methyl-2-pyrrolidone, acetone, ethanol, methanol, iso-propanol, and dimethylformamide. In a specific embodiment, the solvent includes two or more solvents selected from the preceding group.

The electrochemically active material may be an anode material in certain cases. In other cases, the electrochemically active material may be a cathode material. In some embodiments, the electrochemically active material includes one or more materials selected from the group consisting of lithium titanium oxide, silicon, graphite, silicon alloys, tin, tin alloys, germanium, germanium alloys, titanium, titanium alloys, carbon, metal oxides, metal sulfides or composites comprised of silicon, oxygen and carbon. The electrochemically active material may also be a lithium metal oxide or lithium mixed metal oxide selected from the group consisting of $LiCoO_2$, $LiMnO_2$, $LiNiO_2$, $LiNi_xCo_{1-x}O_2$, $LiNi_xCo_yMn_{(1-x-y)}O_2$, $LiNi_xCo_yAl_{(1-x-y)}O_2$, where x and y are each between about 0 and 1. In other implementations, the electrochemically active material may be a lithium metal phosphate or lithium mixed metal phosphate selected from the group consisting of $LiFePO_4$, $LiMnPO_4$, $LiCoPO_4$, $LiFe_xMn_{1-x}PO_4$, $LiNi_xMn_{1-x}O_4$, where x is between about 0 and 1.

In some embodiments of the method outlined above, removing the solvent from the mixture may include drying at a pressure less than about 760 mmHg. Removing the solvent from the mixture may also include elevating the temperature of the mixture. In certain implementations, the inert atmosphere under which the electrochemically active material coated with the carbon containing precursor is heated includes one or more gases selected from the group consisting of nitrogen, argon, and carbon dioxide. The method may also include, in some cases, mixing the coated electrochemically active material in to a slurry including a binder, and coating the slurry onto a conductive substrate. In a particular case, the conductive substrate is a metal foil. The slurry may include conductive additives, though in certain cases no conductive additives are present in the slurry.

When preparing the mixture of electrochemically active material, the weight ratio of carbon in the carbon containing precursor to the total amount of electrochemically active material in the mixture may be between about 0.1-10%, for example between about 0.5-5%. After heating the carbon coated electrochemically active material, the weight ratio of carbon in the carbon coating to the carbon in the carbon containing precursor may be between about 50-99%. In certain implementations, substantially all of the carbon in the carbon containing precursor is carbonized.

In a further aspect of the embodiments herein, an electrochemically active material is disclosed, such material being prepared in accordance with the method outlined above. The electrochemically active material may be prepared according to some, but not all of the details disclosed above.

In another aspect of the embodiments described herein, an electrode is provided having an electrochemically active material prepared in accordance with the method outlined above. The electrochemically active material may be prepared according to some, but not all of the details disclosed above.

A further aspect of the disclosed embodiments is a rechargeable electrochemical cell including an electrochemically active material prepared in accordance with the method outlined above. Again, the electrochemically active material may be prepared according to some, but not all of the details disclosed above.

These and other embodiments are described further below with reference to the figures.

DETAILED DESCRIPTION OF EXAMPLE EMBODIMENTS

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with specific embodiments, it will be understood that these embodiments are not intended to be limiting.

Provided are methods for processing electrochemically active materials and resulting active material structures for use in rechargeable batteries. The methods may involve depositing carbon containing material to partially or completely cover the surface of the active material structures. Deposition of the carbon containing material onto the active material structures reduces catalytic activity of the resulting structures and improves their conductivity relative to unprocessed active materials. This processing is particularly useful for active material structures that have small size, such as particles having a principal dimension of, on average, less than about 10 micrometers or, more specifically, less than less than about 1 micrometer and even less than about 0.1 micrometer. A carbon coating layer thickness may be between about 1 nanometer and about 100 nanometers.

Small structures (e.g., particles) having large surface areas are susceptible to electrolyte decomposition and rely on electric contacts between the structures and other components within the electrode layer to conduct electricity to battery terminals. However, the processes described herein may be used in conjunction with particles of any size. Some examples of electrochemically active materials that can be treated using these techniques include, but are not limited to, anode materials and cathode materials. A few exemplary electrode materials are lithium titanate, lithium manganese dioxide, and lithium iron phosphate. Other examples are listed below.

Figure 6:
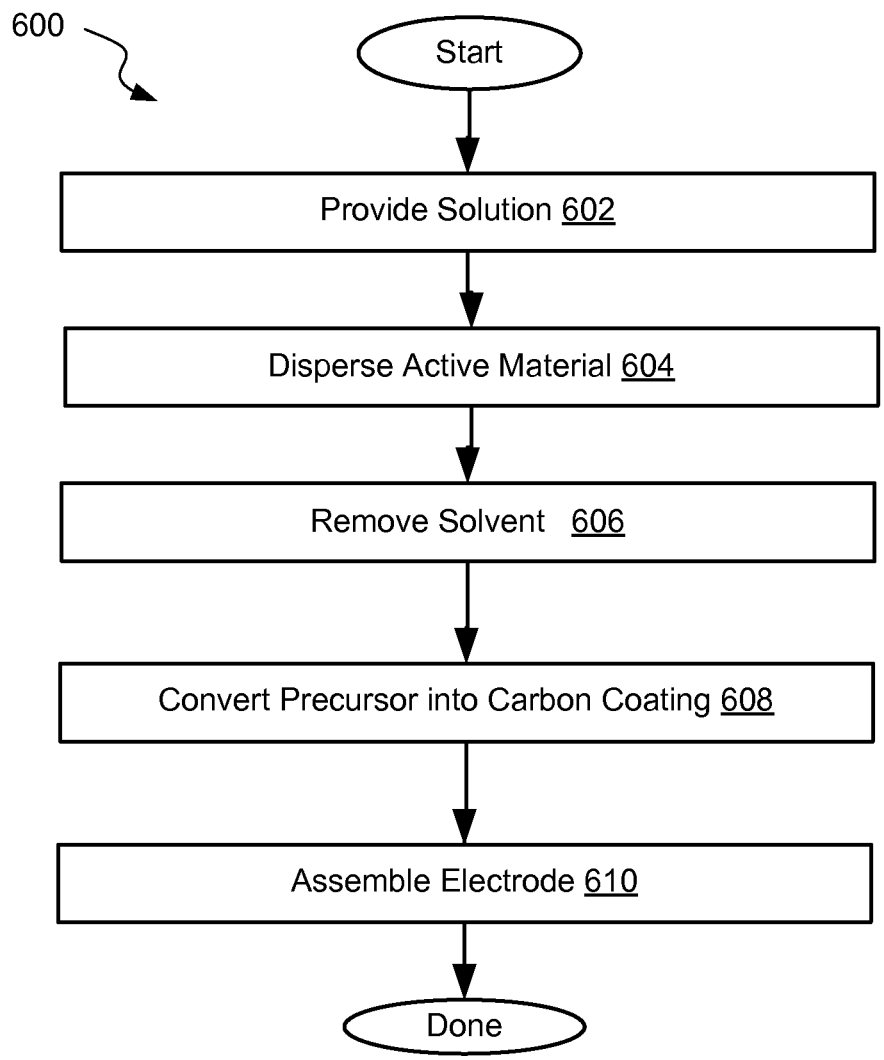
FIG. 6 is a process flowchart corresponding to a method of processing an electrochemically active material for use in a rechargeable cell, in accordance with certain embodiments.

FIG. 6 is a process flowchart of a method 600 for processing an electrochemically active material for use in a rechargeable cell, in accordance with certain embodiments. Method 600 begins with providing a solution including a solvent and carbon containing precursor as shown in operation 602. The solvent may be water or other suitable solvent such as N-Methyl-2-pyrrolidone (NMP), acetone, ethanol, methanol, isopropanol, or dimethylformamide. While aqueous solutions may be easier to work with, some active materials may require solutions that are substantially free of water because of various undesirable reactions. Some examples of such active materials include, but are not limited to, certain cathode materials such as nickel cobalt aluminum oxide (NCA), nickel cobalt manganese oxide, and nickel manganese oxide.

The carbon containing precursor used in the solution may be a simple or complex carbohydrate (typically having the empirical formula $C_m(H_2O)_n$). Examples of simple carbohydrates include monosaccharides, disaccharides, and oligosaccharides. Specific examples include glucose, fructose, and sucrose. Larger carbohydrates such as polysaccharides may also be used. Examples include starches and celluloses, such as carboxymethyl cellulose. Mixtures of carbohydrates such as those found in certain natural products may be used. Examples include corn syrup or sugar cane juice concentrate, each of which can be used in solution form.

Additional examples of carbon containing precursors include polycarboxylic acids, saturated or non-saturated fatty acids, and glycerol esters. Selection of carbon containing precursors generally depends on the precursors' solubility in a given solvent and ability to achieve a viscosity suitable for processing.

In certain embodiments, the viscosity of the precursor solution is less than about 100,000 cP. This viscosity allows for sufficient dispersion of the active material without requiring significant amounts solvent in the solution. In certain embodiments, a solution of the precursor is made by mixing a carbon containing precursor with a solvent under conditions that facilitate solubilization and/or dispersion of the precursor. Various forms of mechanical agitation may be employed. An elevated temperature may be employed to facilitate mixing. In certain embodiments, the precursor and solvent are mixed in a high shear mixer at about 1500-2000 RPM, typically at an elevated temperature (e.g., at about 35-50° C.) to improve solubility. In the same or other embodiments, for example where polyacrylic acid or carboxymethyl cellulose is used, the solution can be left to rest (for e.g., about 2-4 hours) to ensure full solubility of the precursor. To ensure coverage of small active material particles, carbon containing precursor molecules should be relatively small in size. In certain embodiments, carbon containing precursors include molecules having molecular weights less than about 10,000 or even less than about 1,000.

Selection of carbon containing precursors may also depend on their melting, evaporating, and decomposing properties. Specifically, after active material particles are coated with a carbon containing precursor, the coated particles are heated to (at least partially) decompose the carbon containing precursor. At least the carbon component of the precursor should be retained, while other components of the precursor are at least partially removed. Evaporation and melting of the precursor during heating is not desirable as it may cause loss of the precursor and other undesirable effects (e.g., uneven redistribution of the precursor). While some redistribution of the carbon containing precursor on the active material particles is acceptable, substantial redistribution may cause an eventual carbon coating to have non-uniform coverage over the particle. In certain embodiments, at least about 80% of the carbon from the carbon containing precursor which is retained on the active material particles before heating is retained on the active material particles after heating.

Figure 3:
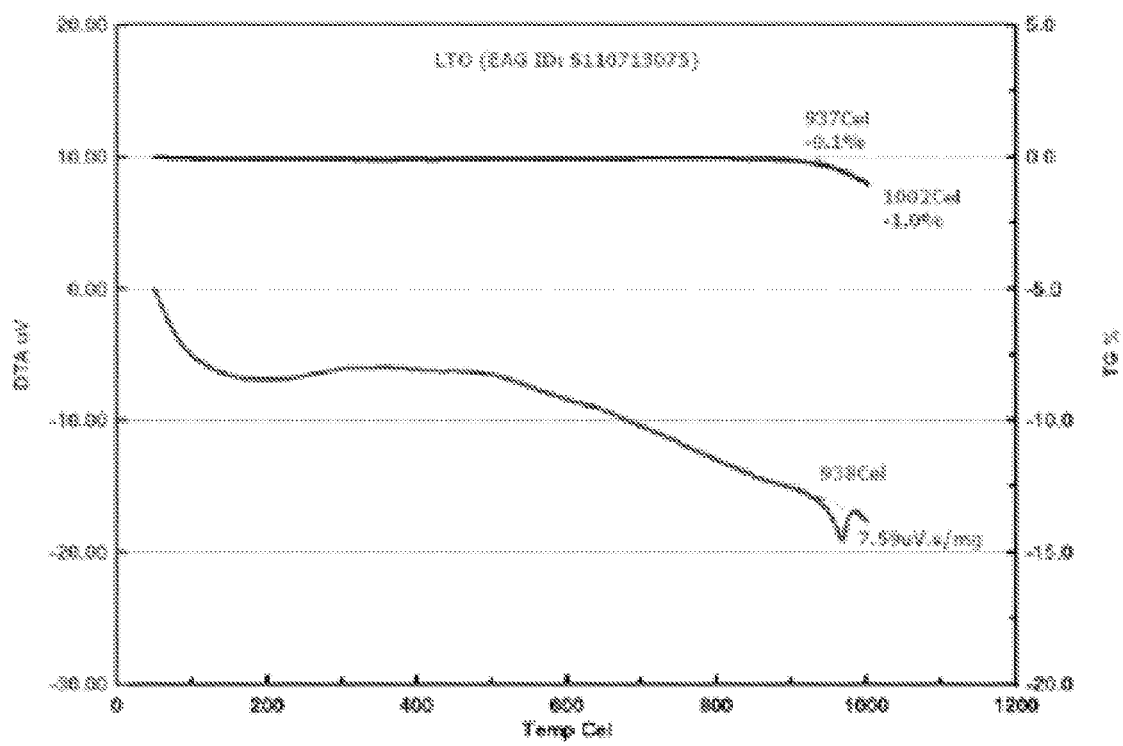
FIG. 3 is a plot thermal gravimetric analysis (TGA) of lithium titanium oxide.
Figure 4:
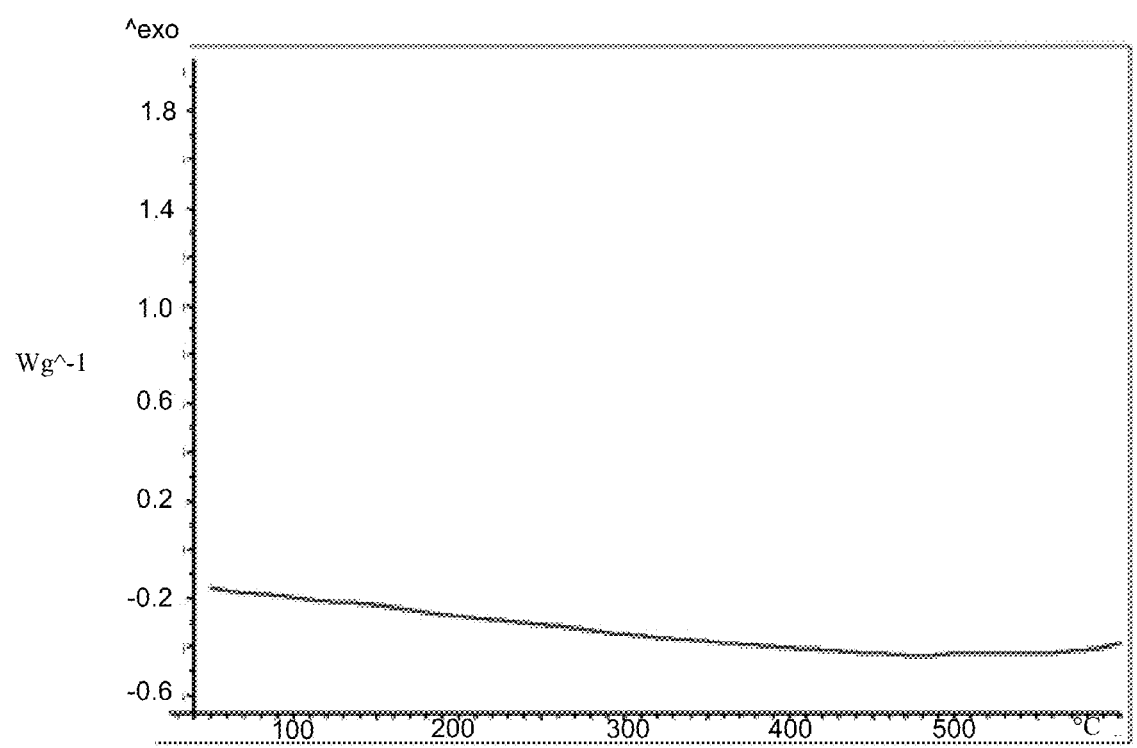
FIG. 4 is a plot of differential scanning calorimetry (DSC) of lithium titanium oxide.

Provided carbon containing precursors decompose at relatively low temperatures that do not deteriorate the coated electrochemically active materials. Generally, active materials are stable at temperatures of at least about 500° C., at least about 700° C. and even higher. For example, sucrose decomposes at a temperature of about 186° C. Sucrose may be used on particles containing lithium titanium oxide (LTO), which is stable up to about 800° C. as evident from the thermal gravimetric analysis (TGA) and the differential scanning calorimetry (DSC) plots presented in FIGS. 3 and 4, respectively. Some precursors decompose at even lower temperatures. For example, glucose decomposes at about 150° C., and fructose decomposes at about 103° C. Many active materials are stable at these temperatures. Specifically, $LiNi_{0.5}Mn_{1.5}O_4$ is stable up to approximately 600° C., LTO is stable up to about 800° C., lithium nickel cobalt aluminum oxide (NCA) is stable up to about 400° C., and lithium cobalt oxide (LCO) is stable up to about 600° C.

The viscosity of the precursor solution will largely determine the concentration of the carbon containing precursor in solution. The viscosity should be sufficient to achieve adequate mixing and coating of the active material particles. When low molecular weight precursors are used, such as glucose or sucrose, the concentration of the precursor in the solution can reach up to about 30%. However, when higher molecular weight precursors are used, such as poly-acrylic acid or carboxymethyl cellulose, the concentration of these precursors may be between about 0.1% to 10%. The viscosity of the solution provided during operation 602 also depends on the loading of the active materials into the solution during subsequent operations. Overall, the driving parameters which determine the ideal concentration of precursor in solution may include the viscosity of the dispersion after the active material particles are added to the solution and the weight ratio of the carbon in the carbon containing precursor to the active material, as further described below.

Method 600 proceeds with dispersing the electrochemically active material in the solution to form a mixture during operation 604. The amount of active material added to the solution may depend on the concentration of the carbon containing precursor(s) and the carbon content of each carbon containing precursor in the solution. In certain embodiments, a weight ratio of the total weight of carbon in the carbon containing precursor to the total weight of electrochemically active material in the mixture is between about 0.1% and 20%, or more specifically, between about 0.5% and 5%. As used herein, a weight ratio corresponds to 100*(weight of material A)/(weight of material B), and this weight ratio is reported in terms of a percent. This weight ratio depends on the size of the active material particles and the types of active materials (e.g., their molecular weights). In general, active materials having smaller particle sizes and smaller molecular weights will have higher weight ratios of the carbon in the carbon containing precursor to the electrochemically active material. In certain specific embodiments, $Li_4Ti_5O_{12}$ (LTO) having an average particle size of about 100 nm may be coated with a precursor that is added to the LTO at a weight ratio between about 5-30%. Such loading of the carbon containing precursor corresponds to a carbon coating having a thickness of about 0.5-3 nm. For LTO having an average particle size of about 10 micrometers, the amount of added carbon may be less to achieve the same thickness of the coating. Without being restricted to any particular theory, it is believed that when a weight ratio of carbon in the carbon containing precursor to LTO is between about 0.5%-10% for such particles, the thickness of the resulting coating will be between about 0.5 to 10 nanometers.

The weight ratio may be selected to provide substantially complete carbon coverage (e.g., at least about 95% coverage), or partial carbon coverage, of active material particles after pyrolysis. Furthermore, the weight ratio may determine the thickness of carbon deposits. While some limited amount of carbon deposition may beneficially reduce catalytic activity of an electrochemically active material and increase its conductivity within an electrode layer, excessive carbon deposition may interfere with performance of the active materials, such as by reducing its cycling capabilities.

Returning to dispersion operation 604, high shear mixing may be used to ensure adequate contact between active material particles and carbon containing precursor, and to ensure substantially homogeneous coverage of the particles with the active material precursors. High-shear mixing and/or ball milling may be used to obtain adequate dispersion and breaking up of active material agglomerates. A viscosity of the resulting mixture may be between about 1,000 cP and 100,000 cP. Lower viscosity may help to ensure dispersion, at least initially, but may result in particles undesirably settling within the solution. In certain embodiments, continuous agitation and/or dispersion is performed while removing the solvent in a later operation to ensure adequate coverage. The agitation may be stopped when the mixture reaches a certain viscosity at which settling of the particles becomes a lesser concern. In certain embodiments, surfactants and other dispersing agents may be added into the mixture to assist with dispersion and maintaining the active material particles in a suspension. Furthermore, the amount of solvent used in the mixture is controlled to avoid unnecessarily lengthy solvent removal operations.

Method 600 may continue with removing the solvent from the mixture to form the electrochemically active material coated with the carbon containing precursor during operation 606. This operation may be performed, at least initially, in the same equipment as dispersion operation 604. For example, the mixture may be heated up while continuously stirring the mixture to initiate evaporation of the solvent. In certain embodiments, the mixing container may operate at a reduced pressure and/or during gas purging to reduce the concentration of solvent vapor above the mixture and to further stimulate the solvent removal. When the mixture reaches a viscosity at which settling of the active material particles is minimal, the mixing may stop. However, heating and/or application of vacuum may continue until a solvent content in the solution reaches a predetermined level.

At this point, method 600 may proceed with heating the electrochemically active material coated with the carbon containing precursor in an inert atmosphere at a temperature to convert (at least partially) the carbon containing precursor into a carbon coating during operation 608. The temperature, duration, types of materials, and other parameters determine the level of carbonization. In certain embodiments, a weight ratio of the carbonized precursor to the total initial precursor is between about 50-99% or, more specifically, between about 75-90%. The degree of carbonization may be determined by various techniques including, for example, infrared (IR) spectrometry, weight analysis, and other analytical techniques. In other embodiments, substantially the entire amount of the coated carbon containing precursor is carbonized (e.g., at least about 75% carbonization).

The temperature during carbonization operation is determined by carbon containing precursors, or more specifically, their decomposition temperature. In certain embodiments, the temperature may be brought up to between about 150° C. and 800° C., or to between about 200° C. to 700° C., or to between about 300° C. to 500° C. While higher temperatures may help expedite the carbonization operation, excessively high temperatures may result in changes to the structure and composition of the active material. In certain embodiments, active material particles do not change their internal structures and/or composition during deposition of the carbon coating over these particles (including during carbonization). Furthermore, the temperature may be controlled to achieve a desirable level of carbonization, and in certain implementations the temperature may be controlled automatically by a controller executing instructions to achieve a certain level of carbonization.

Carbonization can be carried out in a box furnace or a tube furnace under a flow of nitrogen or argon, or under vacuum in a vacuum furnace. The resulting material may be ball-milled or otherwise dispersed to break up the agglomerates. At this point, method 600 may proceed by using the resulting materials for building battery electrodes. This assembly operation 610 may include several suboperations such as mixing the resulting material into a slurry, coating the slurry onto a conductive substrate, drying the coating, calendaring and slitting the electrodes, assembling the electrodes into a stack or jellyroll, and performing later battery assembly operations.

Rechargeable batteries are used for many applications such as automotive (starters, electrical vehicles, hybrid electrical vehicles), portable consumer devices, tools, uninterruptible power supplies, grid balancing, medical, aerospace, and many other applications. Designers constantly strive to improve cost, capacity, rate capabilities, and cycling characteristics of rechargeable batteries. Different applications require combinations of these and other characteristics. For example, hybrid electrical vehicles require large batteries with high charge and discharge rate capabilities, while consumer electronics need smaller batteries with large capacity.

Specific selection of active materials achieves some of these requirements. Lithium titanate, which is often referred to as lithium titanium oxide (LTO), and which has a chemical formula of $Li_4Ti_5O_{12}$, is an anode active material with exceptional charge-discharge characteristics. Lithium-titanate nanocrystals have a surface area that is sometimes more than about 30 times greater than the surface area of the carbon active material, which is conventionally used in lithium ion batteries. The higher surface area allows faster insertion and removal of lithium during cycling, which is evidenced by high charge and discharge rates.

However, cells fabricated with lithium titanate tend to generate more gas during cycling and storage, especially at high temperatures, than other types of lithium ion cells. Often this gas generation continues long after initial formation cycles. Without being restricted to any particular theory, it is believed that metal oxides and mixed metal oxides of titanium, nickel, cobalt, aluminum and/or manganese catalyze oxidation of electrolyte. Specifically, swelling of lithium nickel aluminum oxide (NCA) pouch cells is believed to be, at least partially, due to the presence of hydroxide groups on the electrochemically active surface of the pouch cells, causing oxidation of the electrolyte.

It has been shown that some anode materials, such as lithium titanium oxide, catalyze the decomposition of the electrolyte. Decomposition of the electrolyte results in, e.g., gas generation, impedance increase, and decrease in the useful life of the battery. A proposed mechanism of electrolyte decomposition involves hydroxide groups on the electrochemically active material surface. The molecules of the solvents are catalytically reduced on the surface of the LTO in places were hydroxide groups are present. Other electrochemically active materials employed in lithium ion batteries have other properties, often imparted by surface species that introduce undesirable effects in the functioning or fabrication of the batteries. Carbon containing coatings can reduce these issues at least to a certain degree.

Electrochemical Cells

The embodiments described herein may be used in prismatic and cylindrical electrochemical cells. For purposes of this document, a prismatic electrochemical cell is defined as a cell having a rectangular profile within a plane perpendicular to the length of the cell. In other words, the prismatic cell has a rectangular profile within a plane formed by its thickness and width. Prismatic cells should be distinguished from round (cylindrical) cells that have a circular profile within this plane.

Prismatic cells generally conform better to battery cases and other enclosures, as compared to round cells. This is especially true where multiple cells are packed side by side in the enclosure. Further, in a stack design, prismatic stacked cells tend to have better current delivery capabilities, as there are multiple cathodes and multiple anodes and corresponding tabs forming such cells. Round cells typically have a single cathode, single anode, and one or more tabs attached to each electrode. As such, prismatic cells may be made into larger formats and have larger capacities. In certain embodiments, an electrochemical cell including a venting device has a capacity of at least about 1.0 Ah or, more specifically, a capacity of at least about 5 Ah.

Large capacity electrochemical cells (e.g., cells having a capacity of about 3 Ah or greater) should have more effective safety devices relative to their low capacity counterparts, as there are a lot more safety concerns with the large cells. For example, large cells can cause a lot more damage when they reach a critical pressure level at which the case may burst or some other negative phenomena may occur.

Mechanical Components—Cases, Headers, Terminals, Venting Devices

Figure 1A:
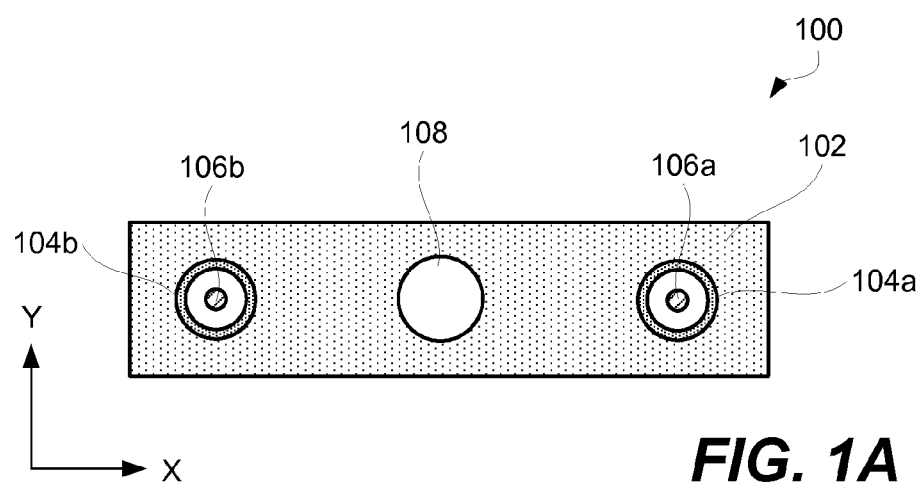
FIGS. 1A and 1B are schematic top and side views, respectively, of a prismatic electrochemical cell, in accordance with certain embodiments.
Figure 1B:
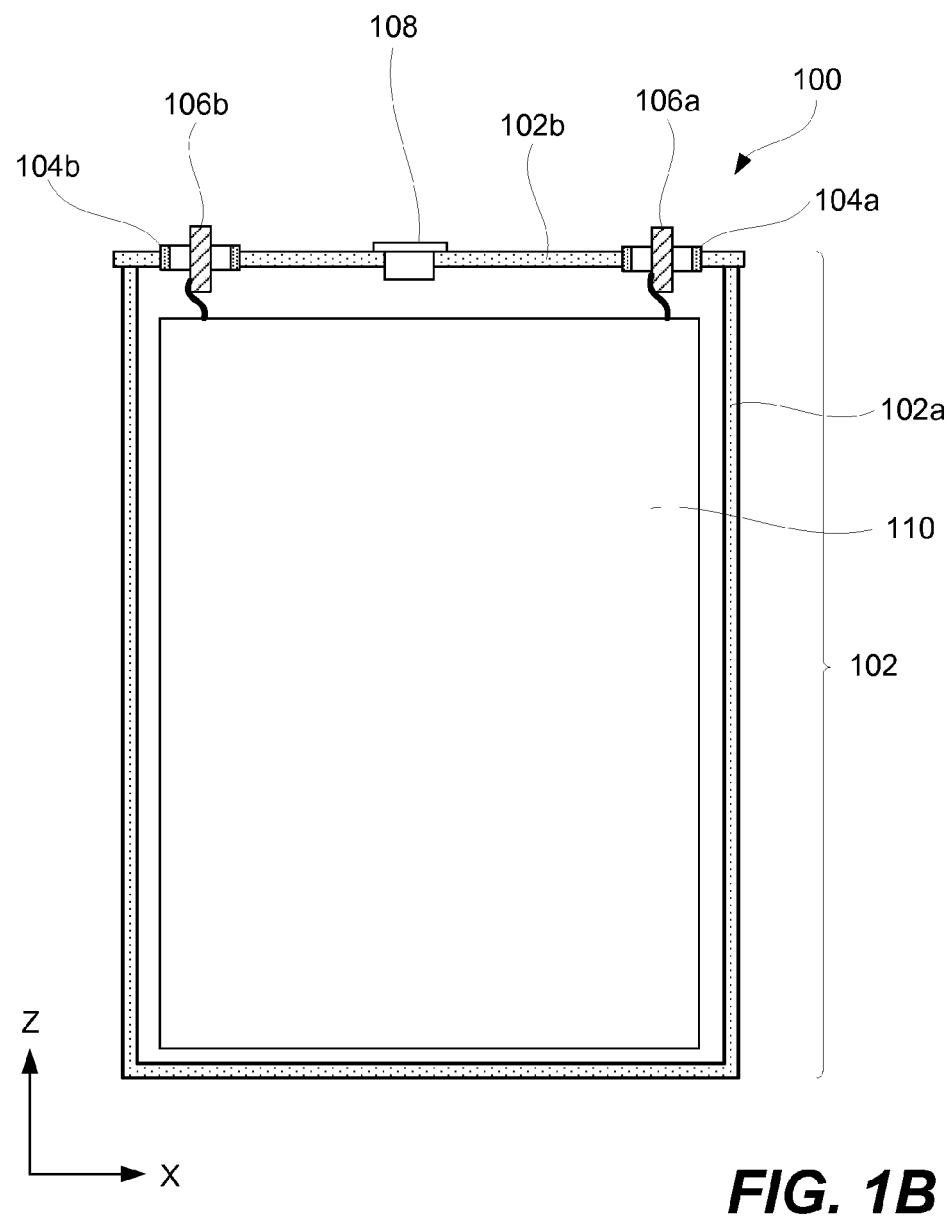

A rechargeable electrochemical cell includes one or more pairs of positive and negative electrodes, electrolyte providing ionic communication between the electrodes, and an enclosure assembly containing the electrodes and electrolyte. The enclosure assembly may have multiple components that provide mechanical enclosure and electrical communication functions. FIGS. 1A and 1B are schematic representations of an electrochemical cell 100 illustrating some of these components, in accordance with certain embodiments. Cell 100 includes an enclosure assembly 102 that surrounds and encloses an electrode assembly 110. Enclosure assembly 102 is shown to include a case 102a and header 102b attached to case 102a. Enclosure assembly 102 may include other components, such as a case bottom, various seals and insulating gaskets, which are not specifically shown in FIGS. 1A and 1B.

Header 102b is shown to include feed-throughs 104a and 104b and venting device 108. One of these components may be used as a fill plug or a separate component may be provided and used as a fill plug. Feed-throughs 104a and 104b include corresponding conductive elements 106a and 106b that provide electronic communication to respective electrodes in electrode assembly 110 as further described with reference to FIG. 1C. In certain embodiments, external components of conductive elements 106a and 106b may be used as cell terminals for making electrical connections to the battery. Conductive elements 106a and 106b may be insulated from header 102b. In other embodiments, header 102b and/or 102a may provide one or both electronic paths to the electrodes in electrode assembly 110. In these embodiments, a cell may have only one feed-through or no feed-throughs at all.

In certain embodiments (not shown), the feed-throughs and/or venting device may be supported by other components of enclosure assembly 102, such as the case and/or bottom. Further, the feed-throughs and/or venting device may be integrated into a header or other components of the enclosure assembly during fabrication of these components or during assembly of the cell. The latter case allows more flexibility in design and production.

Components of enclosure assembly 102 may be made from electrically insulating materials, such as various polymers and plastics. These materials need to be mechanically/chemically/electrochemically stable at the specific operating conditions of the cell, including but not limited to electrolytes, operating temperature ranges, and internal pressure build-ups. Some examples of such materials include polyamine, polyethylene, polypropylene, polyimide, polyvinylidene fluoride, polytetrafluoroethylene, and polyethylene terephthalate. Other polymers and copolymers may be used as well. In certain embodiments, components of enclosure assembly 102 may be made from conductive materials. In these embodiments, one or more components may be used to provide electronic communication to the electrodes. When multiple conductive components are used for enclosure assembly 102, these conductive components may be insulated with respect to each other using insulating gaskets.

Conductive elements 106a and 106b may be made of various conductive materials such as any metal or metallic alloy. These conductive materials may be isolated from any contact with electrolyte (e.g., external components or components having protective sheaths) and/or electrochemically stable at operating potentials if exposed to electrolyte. Some examples of conductive materials include steel, nickel, aluminum, nickel, copper, lead, zinc and their alloys.

When enclosure assembly 102 includes multiple components, such as case 102a and header 102b, these components may be sealed with respect to each other. The sealing process used depends on the materials used for the components, and may involve heat sealing, adhesive application (e.g., epoxies), and/or welding (e.g., laser welding, ultrasonic welding, etc.). This sealing is performed after inserting electrode assembly 110 into enclosure assembly 102 and typically prior to filling electrolyte into enclosure assembly 102. Enclosure assembly 102 may be then sealed by installing venting device 108 or some other means. However, in certain embodiments the sealing may occur before electrolyte is introduced into the enclosure assembly 102. In such embodiments, the enclosure assembly should provide a mechanism for filling electrolyte after such sealing has taken place. In one example, the enclosure assembly 102 includes a filling hole and plug (not shown).

Electrode Arrangements

Electrode assembly 110 includes at least one cathode and one anode. These two types of electrodes are typically arranged such that they face one another and extend alongside one another within the enclosure assembly 102. A separator may be provided between two adjacent electrodes to provide electric insulation while also allowing ionic mobility between the two electrodes through pores in the separator. The ionic mobility is provided by electrolyte that soaks the electrodes and separator.

The electrodes are typically much thinner than the internal spacing of enclosure assembly 102. In order to fill this space, electrodes may be arranged into stacks and jellyrolls. In a jellyroll, one cathode and one anode are wound around the same axis (in case of round cells) or around an elongated shape (in case of prismatic cells). Each electrode has one or more current collecting tabs extending from that electrode to one of conductive elements 106a and 106b of feed-throughs 104a and 104b, or to some other conductive component or components for transmitting an electrical current to the electrical terminals of the cell.

Figure 1C:
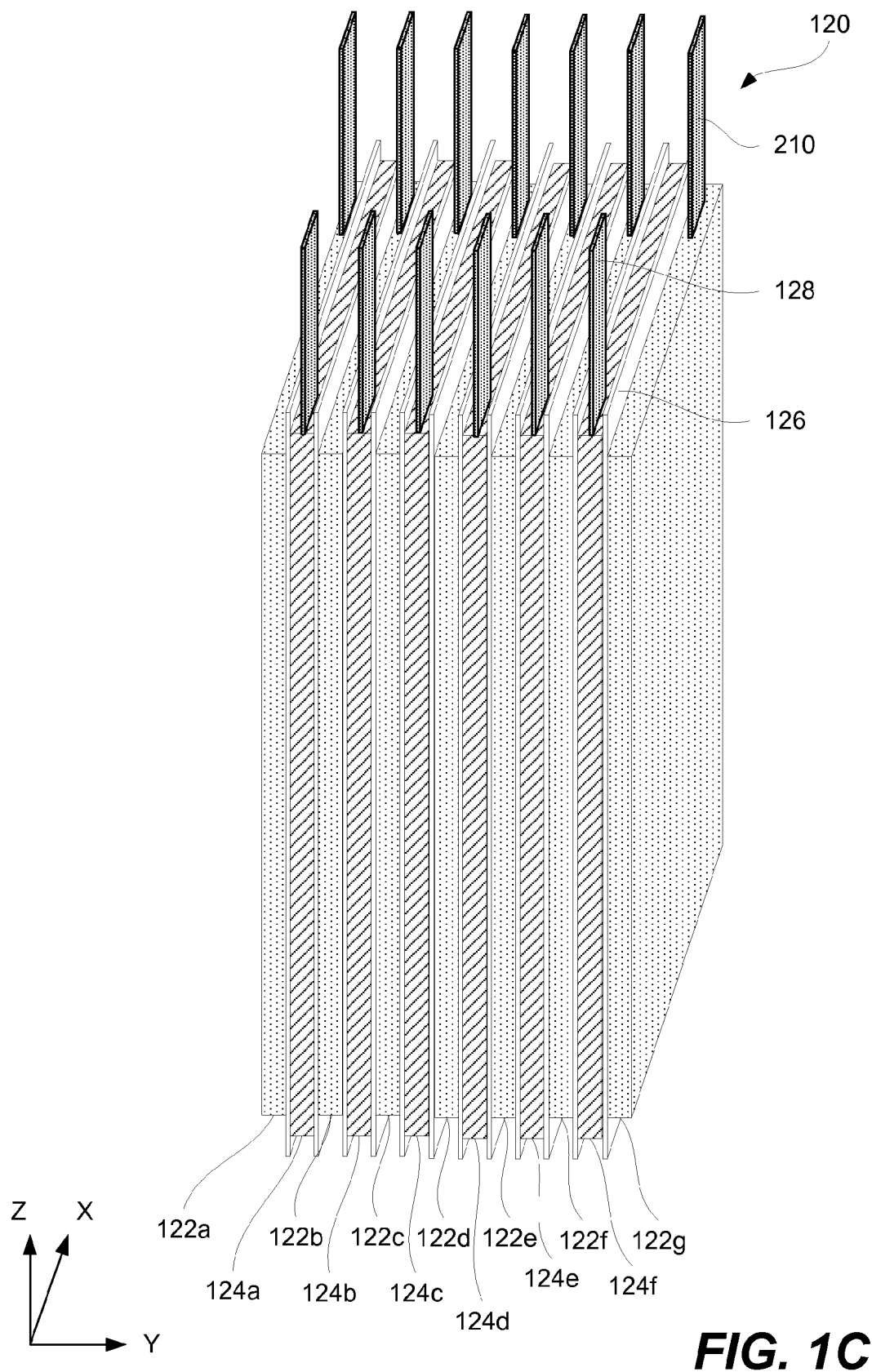
FIG. 1C is a schematic representation of an electrode stack in a prismatic electrochemical cell, in accordance with certain embodiments.

In a stackable cell configuration, multiple cathodes and anodes may be arranged as parallel alternating layer. One example of a stackable electrode assembly 120 is shown in FIG. 1C. Electrode assembly 120 is shown to include seven cathodes 122a-122g and six anodes 124a-124f. Adjacent cathodes and anodes are separated by separator sheets 126 to electrically insulate the adjacent electrodes while providing ionic communication between these electrodes. Each electrode may include a conductive substrate (e.g., metal foil) and one or two active material layers supported by the conductive substrate. Each negative active material layer is paired with one positive active material layer. In the example presented in FIG. 1C, outer cathodes 122a and 122g include only one positive active material facing towards the center of assembly 120. All the other cathodes and anodes have two active material layers. One having ordinary skill in the art would understand that any number of electrodes and pairing of electrodes may be used. Conductive tabs may be used to provide electronic communication between electrodes and conductive elements, for example. In certain embodiments, each electrode in electrode assembly 120 has its own tab. Specifically, cathodes 122a-122g are shown to have positive tabs 210, while anodes 124a-124f are shown to have negative tabs.

Figure 2A:
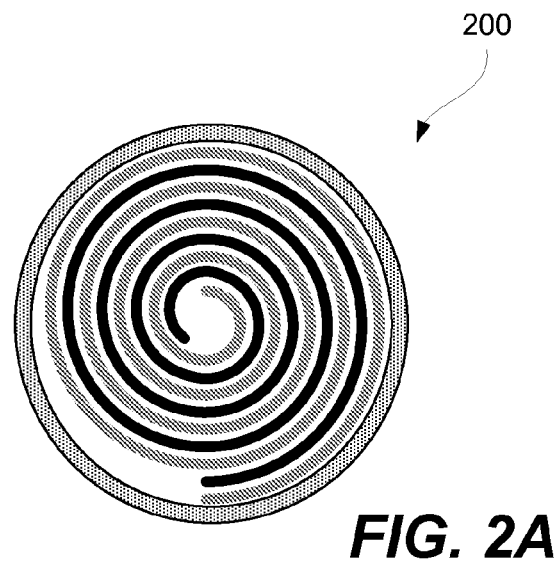
FIGS. 2A and 2B are schematic top and side views, respectively, of a wound electrochemical cell, in accordance with certain embodiments.
Figure 2B:
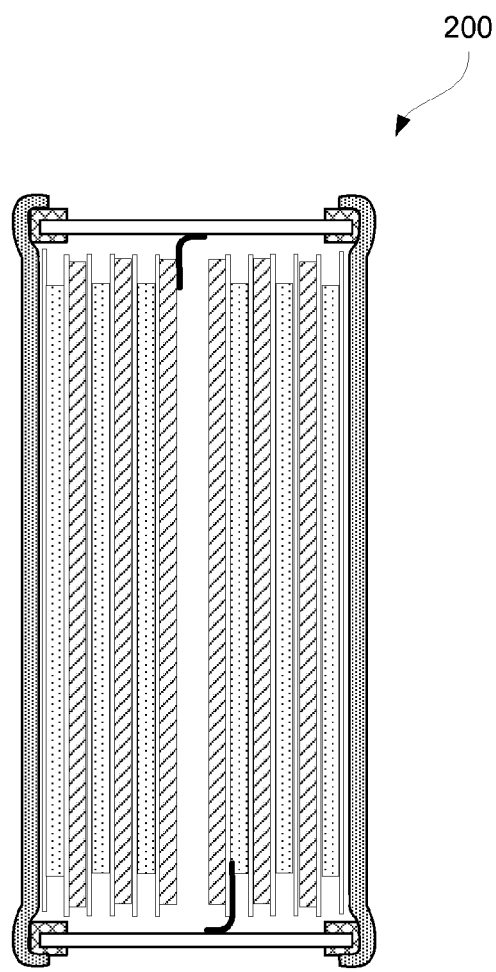

FIGS. 2A and 2B illustrates a wound cell example 200, in which two electrodes are wound into a jellyroll.

Electrochemically Active Materials and Electrolytes

In certain embodiments, a cathode includes one or more active materials and a current collector. The cathode may have an upper charging voltage of about 3.5-4.5 volts versus a Li/Li$^+$ reference electrode. The upper charging voltage is the maximum voltage to which the cathode may be charged at a low rate of charge and with significant reversible storage capacity. In some embodiments, cells utilizing a cathode with upper charging voltages from about 3-5.8 volts versus a Li/Li$^+$ reference electrode are also suitable. In certain instances, the upper charging voltages are from about 3-4.2 volts, about 4.0-5.8 volts, or about 4.5-5.8 volts. In certain instances, the cathode has an upper charging voltage of about 5 volts. For example, the cell can have an upper charging voltage of about 4.9, 5.0, 5.1, 5.2, 5.3, 5.4, 5.5, 5.6, 5.7 or 5.8 volts. A variety of cathode active materials can be used. Non-limiting exemplary electrode active materials include transition metal oxides, phosphates and sulfates, and lithiated transition metal oxides, phosphates and sulfates.

In some embodiments, the electrode active materials are oxides with empirical formula Li$_x$MO$_2$, where M is a transition metal selected from the group consisting of Mn, Fe, Co, Ni, Al, Mg, Ti, V, Si and a combination thereof, with a layered crystal structure. The value x may be between about 0.01 and about 1, between about 0.5 and about 1, or between about 0.9 and about 1.

In other embodiments, the electrode active materials are oxides with the formula Li$_x$M1$_a$M2$_b$M3$_c$O$_2$, where M1, M2, and M3 are each independently a transition metal selected from the group Mn, Fe, Co, Ni, Al, Mg, Ti, V or Si. The subscripts a, b and c are each independently a real number between about 0 and 1 ($0 \le a \le 1$; $0 \le b \le 1$; $0 \le c \le 1$; $0.01 \le x \le 1$), with the proviso that a+b+c is about 1.

In certain instances, the electrode active materials are oxides with the empirical formula Li$_x$Ni$_a$Co$_b$Mn$_c$O$_2$, wherein the subscript x is between 0.01 and 1 (e.g., x is 1); the subscripts a, b and c are each independently 0, 0.1, 0.2, 0.3, 0.4, 0.5, 0.6, 0.7, 0.9 or 1, with the proviso that a+b+c is 1. In other instances, the subscripts a, b and c are each independently between about 0-0.5, between about 0.1-0.6, between about 0.4-0.7, between about 0.5-0.8, between about 0.5-1 or between about 0.7-1 with the proviso that a+b+c is about 1.

In yet other embodiments, the active materials are oxides with the empirical formula Li$_{1+x}$A$_y$M$_{2-y}$O$_4$, where A and M are each independently a transition metal selected from the group consisting of Fe, Mn, Co, Ni, Al, Mg, Ti, V, Si, and a combination thereof, with a spinel crystal structure. The value x may be between about −0.11 and 0.33, or between about 0 and about 0.1. The value of y may be between about 0 and 0.33, or between 0 and about 0.1. In one embodiment, A is Ni, x is 0 and y is 0.5 (i.e., the active material is LiA$_{0.5}$M$_{15}$O$_4$).

In yet some other embodiments the active materials are vanadium oxides such as LiV$_2$O$_5$, LiV$_6$O$_{13}$, or the foregoing compounds modified in that the compositions thereof are nonstoichiometric, disordered, amorphous, overlithiated or underlithiated.

The suitable cathode-active compounds may be further modified by doping with about 5% or less of divalent or trivalent metallic cations such as Fe$^{2+}$, Ti$^{2+}$, Zn$^{2+}$, Ni$^{2+}$, CO$^{2+}$, Cu$^{2+}$, Mg$^{2+}$, Cr$^{3+}$, Fe$^{3+}$, Al$^{3+}$, Ni$^{3+}$Co$^{3+}$, or Mn$^{3+}$, and the like. In other embodiments, cathode active materials suitable for the cathode composition include lithium insertion compounds with olivine structure such as Li$_x$MXO$_4$ where M is a transition metal selected from the group consisting of Fe, Mn, Co, Ni, and a combination thereof, and X is a selected from a group consisting of P, V, S, Si and combinations thereof, and the value of the value x is between about 0 and 2. In certain instances, the compound is LiMXO$_4$. In some embodiments, the lithium insertion compounds include LiMnPO$_4$, LiVPO$_4$, LiCoPO$_4$ and the like. In other embodiments, the active materials have NASICON structures such as Y$_x$M$_2$(XO$_4$)$_3$, where Y is Li or Na, or a combination thereof, M is a transition metal ion selected from the group consisting of Fe, V, Nb, Ti, Co, Ni, Al, or the combinations thereof, and X is selected from a group consisting of P, S, Si, and combinations thereof, and the value of x is between 0 and 3. Examples of these materials are disclosed by J. B. Goodenough in "Lithium Ion Batteries" (Wiley-VCH press, Edited by M. Wasihara and O. Yamamoto). Particle size of the electrode materials may be between about 1 nm and about 100 μm, or between about 10 nm and about 100 μm, or between about 1 μm and 100 μm.

In other embodiments, the electrode active materials are oxides such as LiCoO$_2$, spinel LiMn$_2$O$_4$, chromium-doped spinel lithium manganese oxides $Li_xCr_yMn_2O_4$, layered $LiMnO_2$, $LiNiO_2$, or $LiNi_xCo_{1-x}O_2$, where x is between about 0 and 1, or between about 0.5 and about 0.95. The electrode active materials may also be vanadium oxides such as $LiV_2O_5$, $LiV_6O_{13}$, or the foregoing compounds modified in that the compositions thereof are nonstoichiometric, disordered, amorphous, overlithiated or underlithiated.

The suitable cathode-active compounds may be further modified by doping with about 5% or less of divalent or trivalent metallic cations such as $Fe^{2+}$, $Ti^{2-}$, $Zn^{2+}$, $Ni^{2+}$, $Co^{2+}$, $Cu^{2+}$, $Mg^{2+}$, $Cr^{3+}$, $Fe^{3+}$, $Al^{3+}$, $Ni^{3+}$ $Co^{3+}$, or $Mn^{3+}$, and the like. In yet other embodiments, cathode active materials suitable for the cathode composition include lithium insertion compounds with olivine structure such as $LiFePO_4$ and with NASICON structures such as $LiFeTi(SO_4)_3$. In still other embodiments, electrode active materials include $LiFePO_4$, $LiMnPO_4$, $LiVPO_4$, $LiFeTi(SO_4)_3$, $LiNi_xMn_{1-x}O_2$, $LiNi_xCo_yMn_{1-x-y}O_2$ and derivatives thereof, wherein x and y are each between about 0 and 1. In certain instances, x is between about 0.25 and 0.9. In one instance, x is ⅓ and y is ⅓. Particle size of the cathode active material should range from about 1 to 100 microns.

In some embodiments, the electrode-active material includes transition metal oxides such as $LiCoO_2$, $LiMn_2O_4$, $LiNiO_2$, $LiNi_xMn_{1-x}O_2$, $LiNi_xCo_yMn_{1-x-y}O_2$ and their derivatives, where x and y are each between about 0 and 1. $LiNi_xMn_{1-x}O_2$ can be prepared by heating a stoichiometric mixture of electrolytic $MnO_2$, LiOH and nickel oxide to between about 300 and 400° C. In certain embodiments, the electrode active materials are $xLi_2MnO_3(1-x)LiMO_2$ or $LiM'PO_4$, where M is selected from the group consisting of Ni, Co, Mn, $LiNiO_2$ or $LiNi_xCo_{1-x}O_2$; M' is selected from the group consisting of Fe, Ni, Mn and V; and x and y are each independently a real number between about 0 and 1. $LiNi_xCo_yMn_{1-x-y}O_2$ can be prepared by heating a stoichiometric mixture of electrolytic $MnO_2$, LiOH, nickel oxide and cobalt oxide to between about 300 and 500° C. The cathode may contain conductive additives from 0% to about 90%. In one embodiment, the subscripts x and y are each independently selected from 0.1, 0.15, 0.2, 0.25, 0.3, 0.35, 0.4, 0.45, 0.5, 0.55, 0.6, 0.65, 0.7, 0.75, 0.8, 0.85, 0.9 or 0.95. x and y can be any numbers between about 0 and 1 to satisfy the charge balance of the compounds $LiNi_xMn_{1-x}O_2$ and $LiNi_xCo_yMn_{1-x-y}O_2$.

Representative cathodes and their approximate recharged potentials include $FeS_2$ (3.0 V vs. $Li/Li^+$), $LiCoPO_4$ (4.8 V vs. $Li/Li^-$), $LiFePO_4$ (3.45 V vs. $Li/Li^+$), $Li_2FeS_2$ (3.0 V vs. $Li/Li^+$), $Li_2FeSiO_4$ (2.9 V vs. $Li/Li^+$), $LiMn_2O_4$ (4.1 V vs. $Li/L'^{i+}$, $LiMnPO_4$ (4.1 V vs. $Li/L'^{i+}$, $LiNiPO_4$ (5.1 V vs. $Li/Li^+$), $LiV_3O_8$ (3.7 V vs. $Li/Li^+$), $LiV_6O_{13}$ (3.0 V vs. $Li/Li^+$), $LiVOPO_4$ (4.15 V vs. $Li/Li^+$), $LiVOPO_4F$ (4.3 V vs. $Li/Li^+$), $Li_3V_2(PO_4)_3$ (4.1 V (2 Li) or 4.6 V (3 Li) vs. $Li/Li^+$), $MnO_2$ (3.4 V vs. $Li/Li^+$), $MoS_3$ (2.5 V vs. $Li/Li^+$), sulfur (2.4 V vs. $Li/Li^+$), $TiS_2$ (2.5 V vs. $Li/Li^+$), $TiS_3$ (2.5 V vs. $Li/Li^+$), $V_2O_5$ (3.6 V vs. $Li/Li^+$), and $V_6O_{13}$ (3.0 V vs. $Li/Li^+$) and combinations thereof.

A cathode can be formed by mixing and forming a composition comprising, by weight, between about 0.01-15% (e.g., between about 4-8%) polymer binder, between about 10-50% (e.g., between about 15-25%) electrolyte solution as herein described, between about 40-85% (e.g., between about 65-75%) electrode-active material, and between about 1-12% (e.g., between about 4-8%) conductive additive. An inert filler may also be added up to about 12% by weight, though in certain cases no inert filler is used. Other additives may be included, as well.

An anode may include active materials and a current collector. The anode comprises either a metal selected from the group consisting of Li, Si, Sn, Sb, Al and a combination thereof, or a mixture of one or more anode active materials in particulate form, a binder (in certain cases a polymeric binder), optionally an electron conductive additive, and at least one organic carbonate. Examples of useful anode active materials include, but are not limited to, lithium metal, carbon (graphites, coke-type, mesocarbons, polyacenes, carbon nanotubes, carbon fibers, and the like). Anode-active materials also include lithium-intercalated carbon, lithium metal nitrides such as $Li_{2.6}Co_{0.4}N$, metallic lithium alloys such as LiAl, $Li_4Sn$, or lithium-alloy-forming compounds of tin, silicon, antimony, or aluminum. Further included as anode-active materials are metal oxides such as titanium oxides, iron oxides, or tin oxides.

When present in particulate form, the particle size of the anode active material should range from about 0.01 to 100 microns, e.g., from about 1 to 100 microns. In some cases the anode active materials include graphites such as carbon microbeads, natural graphites, carbon nanotubes, carbon fibers, or graphitic flake-type materials. Alternatively or in addition, the anode active materials may be graphite microbeads and hard carbon, which are commercially available.

An anode can be formed by mixing and forming a composition comprising, by weight, between about 2-20% (e.g., 3-10%) polymer binder, between about 10-50% (e.g., between about 14-28%) electrolyte solution as described herein, between about 40-80% (e.g., between about 60-70%) electrode-active material, and between about 0-5% (e.g., between about 1-4%) conductive additive. In certain cases an inert filler is added up to about 12% by weight, though in other cases no filler is used. Additional additives may also be present.

Suitable conductive additives for the cathode and anode composition include carbons such as coke, carbon black, carbon nanotubes, carbon fibers, and natural graphite, metallic flake or particles of copper, stainless steel, nickel or other relatively inert metals, conductive metal oxides such as titanium oxides or ruthenium oxides, or electrically-conductive polymers such as polyacetylene, polyphenylene and polyphenylenevinylene, polyaniline or polypyrrole. Additives may include, but are not limited to, carbon fibers, carbon nanotubes and carbon blacks with a surface area below about 100 m2/g such as Super P and Super S carbon blacks available from MMM Carbon in Belgium.

The current collector suitable for the cathode and anode includes a metal foil and a carbon sheet selected from a graphite sheet, carbon fiber sheet, carbon foam and carbon nanotube sheet or film. High conductivity is generally achieved in pure graphite and pure carbon nanotube films. Therefore, the graphite and nanotube sheeting should contain as few binders, additives and impurities as possible in order to realize the benefits of the present embodiments. Carbon nanotubes can be present from about 0.01% to about 99% by weight. The carbon fiber can be in the micron or submicron range. Carbon black or carbon nanotubes may be added to enhance the conductivities of certain carbon fibers. In one embodiment, the anode current collector is a metal foil, such as copper foil. The metal foil can have a thickness between about 5 and about 300 micrometers.

The carbon sheet current collector suitable for the present invention may be in the form of a powder coating on a substrate such as a metal substrate, a free-standing sheet, or a laminate. In other words, the current collector may be a composite structure having other members such as metal foils, adhesive layers, and such other materials as may be considered desirable for a given application. However, in any event, according to the present embodiments, it is the carbon sheet layer, or carbon sheet layer in combination with an adhesion promoter, which directly interfaces with the electrolyte and is in electrically conductive contact with the electrode surface.

Suitable binders include, but are not limited to, polymeric binders, particularly gelled polymer electrolytes comprising polyacrylonitrile, poly(methylmethacrylate), poly(vinyl chloride), and polyvinylidene fluoride and copolymers thereof. Also included are solid polymer electrolytes such as polyether-salt based electrolytes including poly(ethylene oxide) (PEO) and its derivatives, poly(propylene oxide) (PPO) and its derivatives, and poly(organophosphazenes) with ethyleneoxy or other side groups. Other suitable binders include fluorinated ionomers comprising partially or fully fluorinated polymer backbones, and having pendant groups comprising fluorinated sulfonate, imide, or methide lithium salts. Preferred binders include polyvinylidene fluoride and copolymers thereof with hexafluoropropylene, tetrafluoroethylene, fluorovinyl ethers, such as perfluoromethyl, perfluoroethyl, or perfluoropropyl vinyl ethers; and ionomers comprising monomer units of polyvinylidene fluoride and monomer units comprising pendant groups comprising fluorinated carboxylate, sulfonate, imide, or methide lithium salts.

The electrochemical cell optionally contains an ion conductive layer or a separator. The ion conductive layer suitable for the lithium or lithium-ion battery of the present embodiments is any ion-permeable layer, preferably in the form of a thin film, membrane or sheet. Such ion conductive layer may be an ion conductive membrane or a microporous film such as a microporous polypropylene, polyethylene, polytetrafluoroethylene and layered structures thereof. Suitable ion conductive layers also include swellable polymers such as polyvinylidene fluoride and copolymers thereof. Other suitable ion conductive layers include gelled polymer electrolytes such as poly(methyl methacrylate) and poly(vinyl chloride). Also suitable are polyethers such as poly(ethylene oxide) and poly (propylene oxide). In some cases, preferable separators are microporous polyolefin separators or separators comprising copolymers of vinylidene fluoride with hexafluoropropylene, perfluoromethyl vinyl ether, perfluoroethyl vinyl ether, or perfluoropropyl vinyl ether, including combinations thereof, or fluorinated ionomers.

An electrolyte may include various carbonates, such as cyclic carbonates and linear carbonates. Some examples of cyclic carbonates include ethylene carbonate (EC), propylene carbonate (PC), butylene carbonate (BC), vinylene carbonate (VC), dimethylvinylene carbonate (DMVC), vinylethylene carbonate (VEC), and fluoroethylene carbonate (FEC). The cyclic carbonate compounds may include at least two compounds selected from the group consisting of ethylene carbonate, propylene carbonate, vinylene carbonate, vinylethylene carbonate, and fluoroethylene carbonate. Some examples of linear-carbonate compounds include linear carbonates having an alkyl group, such as dimethyl carbonate (DMC), methyl ethyl carbonate (MEC), diethyl carbonate (DEC), methyl propyl carbonate (MPC), dipropyl carbonate (DPC), methyl butyl carbonate (MBC) and dibutyl carbonate (DBC). The alkyl group can have a straight or branched chain structure.

Examples of other non-aqueous solvents include lactones such as gamma-butyrolactone (GBL), gamma-valerolactone, and alpha-angelica lactone; ethers such as tetrahydrofuran, 2-methyltetrahydrofuran, 1,4-dioxane, 1,2-dimethoxyethane, 1,2-diethoxyethane, and 1,2-dibutoxyethane; nitriles such as acetonitrile, and adiponitrile; linear esters such as methyl propionate, methyl pivalate, butyl pivalate, hexyl pivalate, octyl pivalate, dimethyl oxalate, ethyl methyl oxalate, and diethyl oxalate; amides such as dimethylformamide; and compounds having an S.dbd.O bonding such as glycol sulfite, propylene sulfite, glycol sulfate, propylene sulfate, divinyl sulfone, 1,3-propane sultone, 1,4-butane sultone, and 1,4-butanediol dimethane sulfonate.

Examples of combinations of the non-aqueous solvents include a combination of a cyclic carbonate and a linear carbonate, a combination of a cyclic carbonate and a lactone, a combination of a cyclic carbonate, a lactone and a linear ester, a combination of a cyclic carbonate, a linear carbonate and a lactone, a combination of a cyclic carbonate, a linear carbonate and an ether, and a combination of a cyclic carbonate, a linear carbonate and a linear ester. Preferred are the combination of a cyclic carbonate and a linear carbonate, and the combination of a cyclic carbonate, a linear carbonate and a linear ester.

Examples of electrolyte salts used in non-aqueous electrolytic solutions include: $LiPF_6$, $LiBF_4$, $LiClO_4$; lithium salts comprising a chain alkyl group such as $LiN(SO_2CF_3)_2$, $LiN(SO_2C_2F_5)_2$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, and $LiPF_5(iso-C_3F_7)$; and lithium salts comprising a cyclic alkylene group such as $(CF_2)_2(SO_2)2NLi$, and $(CF_2)_3(SO_2)_2NLi$. More preferred are $LiPF_6$, $LiBF_4$ and $LiN(SO_2CF_3)_2$, and most preferred is $LiPF_6$, though these preferential ingredients are in no way limiting.

The electrolyte salt can be used singly or in combination. Examples of the preferred combinations include a combination of $LiPF_6$ with $LiBF_4$, a combination of $LiPF_6$ with $LiN(SO_2CF_3)_2$, and a combination of $LiBF_4$ with $LiN(SO_2CF_3)_2$. Most preferred is the combination of $LiPF_6$ with $LiBF_4$, though again, these preferential combinations are in no way limiting. There is no specific limitation with respect to the mixing ratio of the two or more electrolyte salts. In the case that $LiPF_6$ is mixed with other electrolyte salts, the amount of the other electrolyte salts preferably is about 0.01 mole % or more, about 0.03 mole % or more, about 0.05 mole % or more based on the total amount of the electrolyte salts. The amount of the other electrolyte salts may be about 45 mole % or less based on the total amount of the electrolyte salts, about 20 mole % or less, about 10 mole % or less, or about 5 mole % or less. The concentration of the electrolyte salts in the non-aqueous solvent may be about 0.3 M or more, about 0.5 M or more, about 0.7 M or more, or about 0.8 M or more. Further, the electrolyte salt concentration preferably is about 2.5 M or less, about 2.0 M or less, about 1.6 M or less, or about 1.2 M or less.

Battery Packs

Provided herein are battery packs, each containing one or more electrochemical cells built with processed active materials. When a battery pack includes multiple cells, these cells may be configured in series, in parallel, or in various combinations of these two connection schemes. In addition to cells and interconnects (electrical leads), battery packs may include charge/discharge control systems, temperature sensors, current balancing systems, and other like components. For example, battery regulators may be used to keep the peak voltage of each individual cell below its maximum value so as to allow weaker batteries to be fully charged, bringing the whole pack back into balance. Active balancing can also be performed by battery balancer devices which can shuttle energy from stronger batteries to weaker ones in real time for improved balance.

Experimental Results

Figure 5:
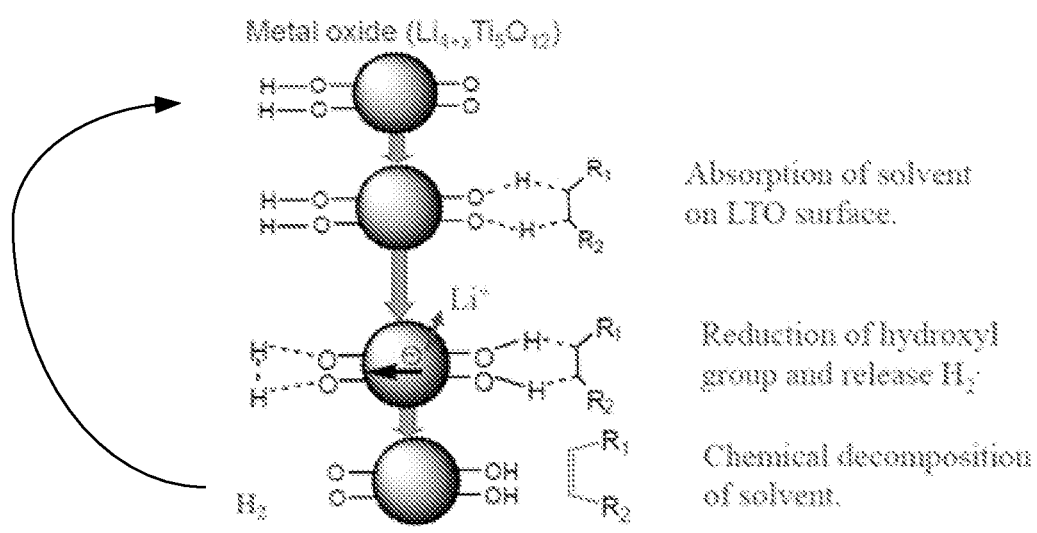
FIG. 5 is a schematic illustration of proposed mechanisms of treating lithium titanium oxide in a Li-ion cell.

Lithium titanium oxide (LTO) material was treated according to techniques described above to improve conductivity of the material when integrated into the electrode and to reduce the catalytic activity of LTO particles when exposed to the electrolyte. It has been demonstrated that LTO may catalyze various reactions that result in gas evolution and impedance increase in a battery electrode. Without being restricted to any particular theory, one such reaction is presented in FIG. 5. To avoid this and other undesirable reactions, a surface of the LTP particles can be coated with carbon based materials to shield the active surface from electrolyte components and bind the —OH groups.

In an experiment designed to treat the LTO material, 6.6 g of sucrose was fully dissolved in 100 ml of water at room temperature. 50 g of LTO powder was then added to the solution and stirred for 5 minutes to obtain good dispersion of material using a magnetic stirring bar. The mixture was placed on a hot plate set to a temperature of 250° C. and stirred continuously to evaporate water for 2 hours. Once the mixture became sufficiently viscous (e.g., above about 20,000 cPs) and the stirring bar could no longer move within the mixture, the mixture was removed from the hot plate and placed onto an alumina dish. The dish was placed into a tube furnace, which was purged with a high flow of nitrogen for 10 minutes. After the purge cycle, the flow of nitrogen was reduced to about 1-2 liters per minute. The temperature was ramped up to 600° C. at a rate of 20° C. per minute. The sucrose was carbonized for 5 hours, and the resulting material was left to cool under a flow of nitrogen. The material was then removed from the alumina dish and ground with a pestle in a mortar for approximately 5 minutes. The resulting material was grey to black, which indicates presence of carbon on the surface of the particles. The starting LTO was a white powder. The weight measurements indicated that the amount of carbon in the final sample was approximately 2% by weight.

Figure 7:
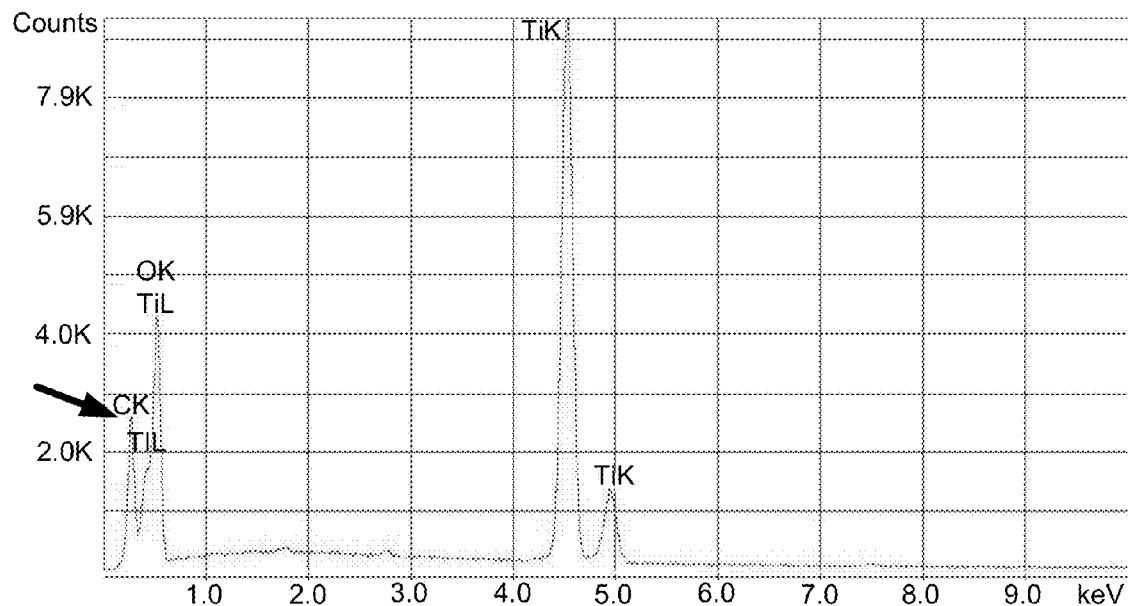
FIG. 7 is a plot representing energy-dispersive X-ray spectroscopy (EDX) analysis results of the LTO material coated with a layer of carbon.

FIG. 7 is a plot representing energy-dispersive X-ray spectroscopy (EDX) analysis results of the LTO material coated with carbon as described in the above experiment. It shows a large Ck peak on the left side that comes from the carbon on the particle surface.

Figure 8:
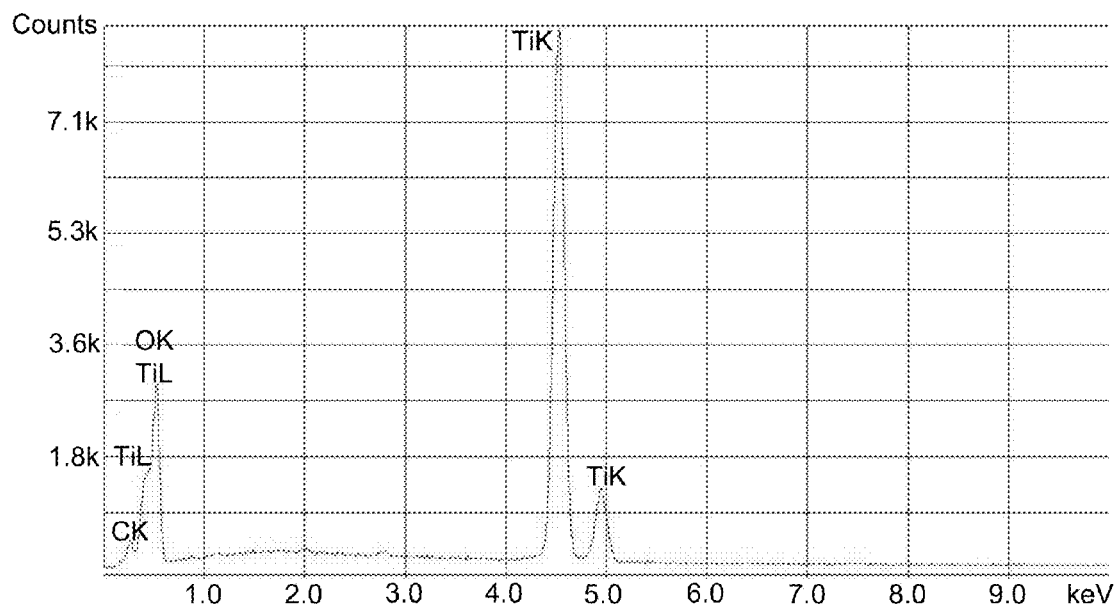
FIG. 8 is a plot representing EDX analysis results of the uncoated LTO material.

FIG. 8 corresponds to the similar EDX analysis results of the uncoated LTO material. It shows significantly smaller Ck peak, which indicates of the presence of conductive tape used for sample fixation.

In another experiment designed to treat LTO materials, ethanol and water were separately used as solvents for dissolving the carbon containing precursor. In evaluating ethanol as a solvent, butylated hydroxytoluene (BHT) was dissolved in ethanol with a weight ratio of 1:55.38 (BHT: ethanol) at room temperature in a beaker by applying high shear force from an overhead mixer with high shear blade for 5 minutes.

The LTO was then well dispersed in the ethanol/BHT solution with a weight ratio of 1:3.665 (LTO:solution) with the same settings above for 10 minutes. The resulting suspension was then heated on a hot plate at a temperature setting of 85° C. under a fume hood until the viscosity of the suspension became greater than 50,000 cPs.

The above slurry was then transferred to an atmosphere controlled furnace and heated at 700° C. for 5 hours with a heating rate of 20° C./min under continuous purging of 99.99% pure Argon gas, and then cooled down to 50° C. before the gas was stopped and the sample was removed from the furnace.

BHT was used as the precursor for carbon coating because of its high carbon yield. With the molecular formula of $C_{15}H_{24}O$, the yield of carbon after completely removing hydrogen and oxygen at high temperature could be as high as about 82%, which is significantly higher compared to other precursors for carbonization such as fructose (about 21%) sucrose (about 42%) or phenol (about 77%).

The sample having water as a solvent was prepared in much the same way, with the substitution of water in place of ethanol. Each sample used LTO with 5% carbon coating.

Figure 9:
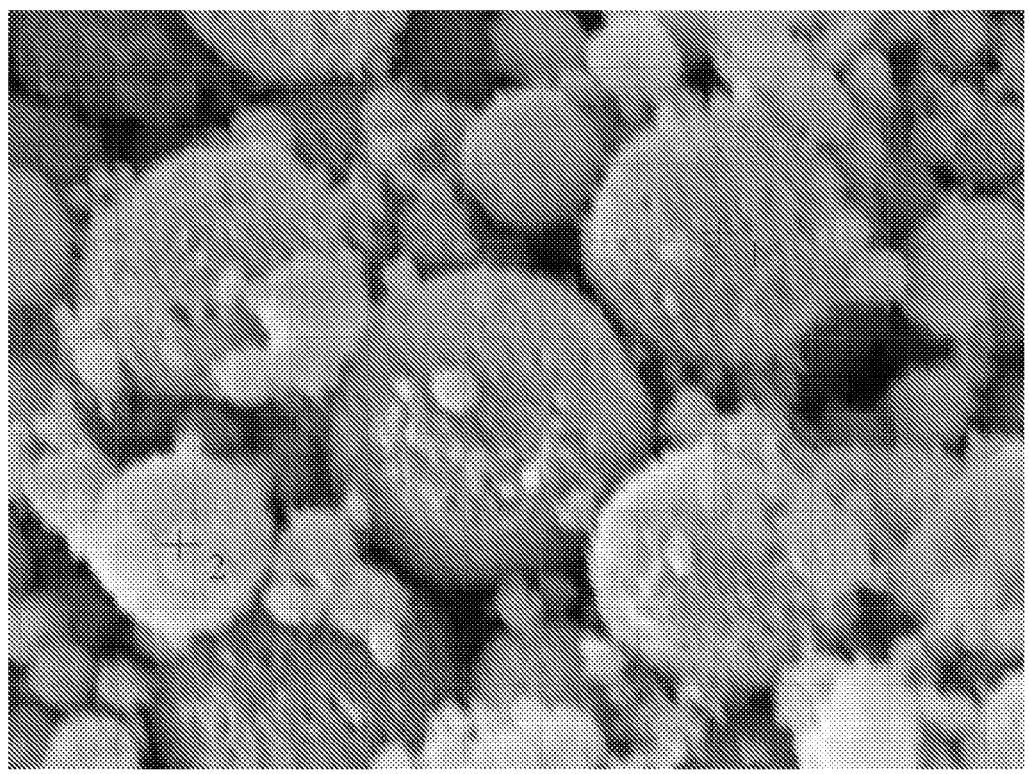
FIG. 9 is a reference SEM image of uncoated LTO material.
Figure 10:
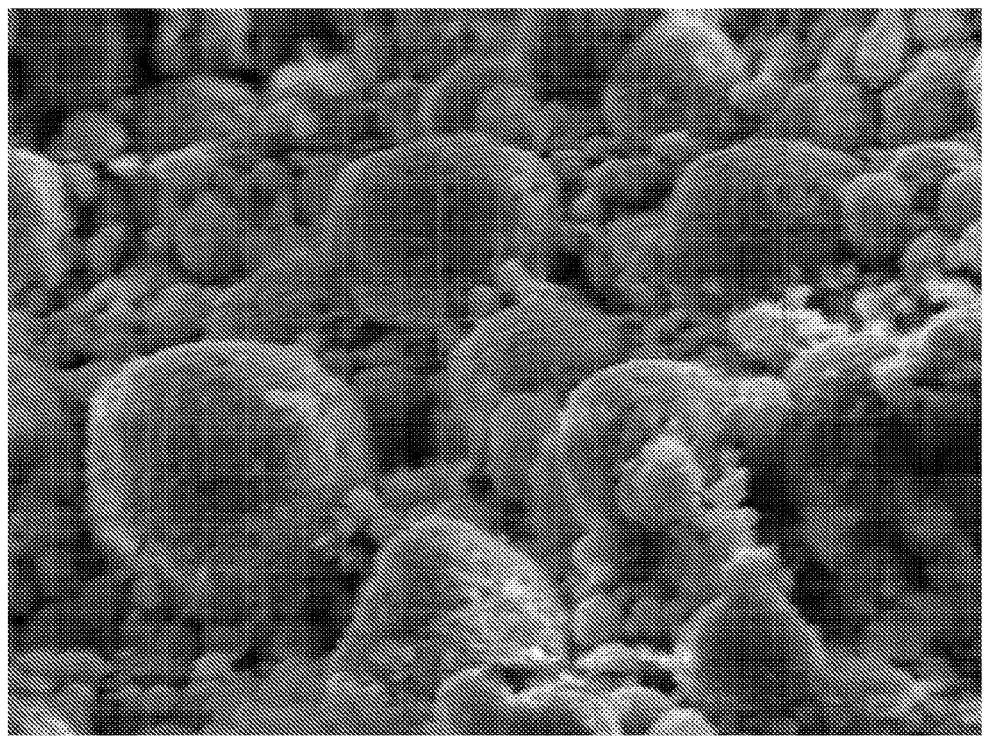
FIG. 10 is an SEM image of the LTO material coated with a layer of carbon, as prepared in an ethanol as a solvent.
Figure 11:
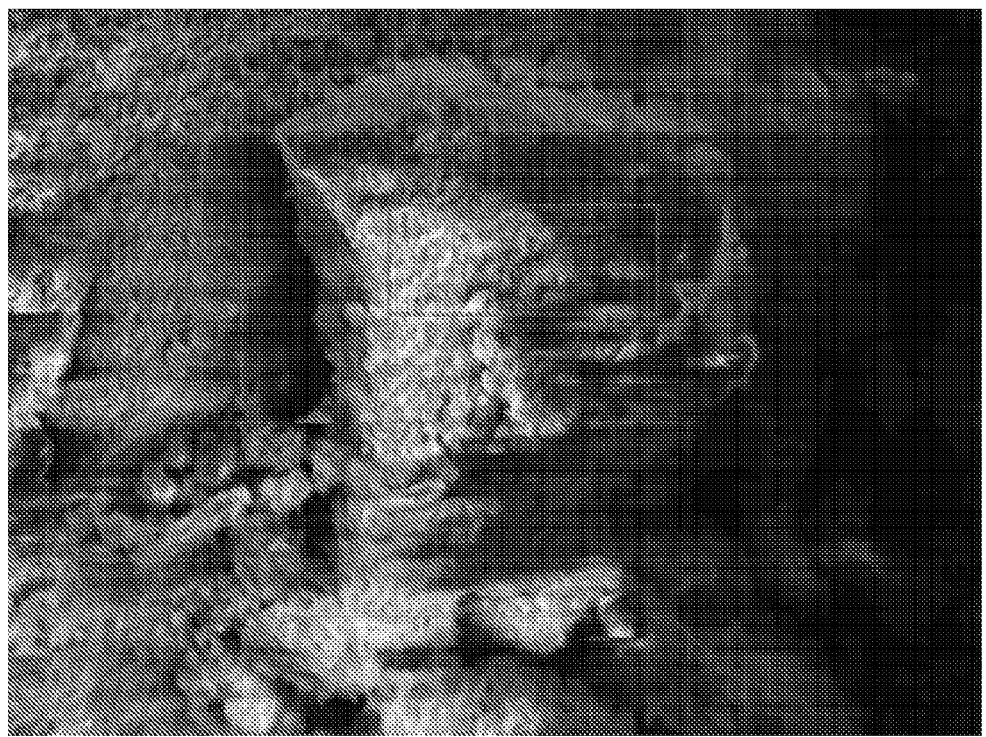
FIG. 11 is an SEM image of the LTO material coated with a layer of carbon, as prepared in a water as a solvent.

The uncoated LTO, sometimes referred to as "pristine LTO," is shown in FIG. 9 for comparison. Generally, when ethanol was used as the solvent, the LTO particles were fully covered with carbon, uniform in particle size distribution, and remained spherical in shape after the carbonization treatment, as shown in FIG. 10. When water was used as the solvent, the LTO particles became irregular and formed aggregates after the carbonization process, as shown in FIG. 11.

Figure 12:
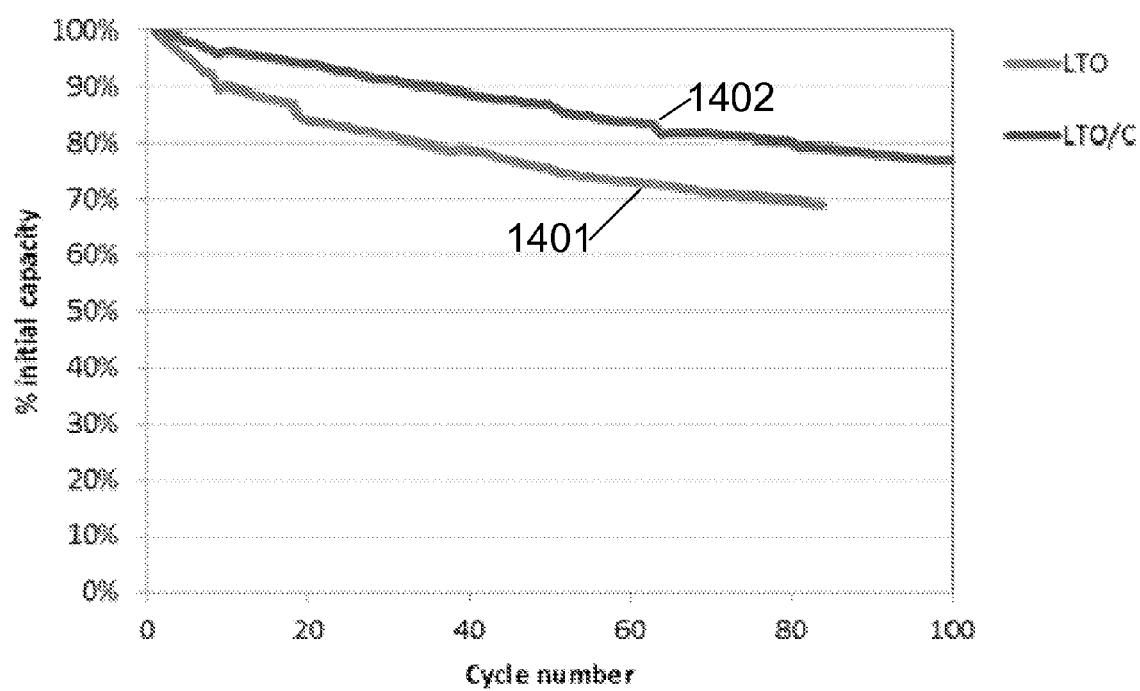
FIG. 12 is a graph depicting the Percent Initial Capacity vs. cycle number for a conventional LTO based cell and a carbon coated LTO based cell prepared in accordance with certain embodiments herein.

In another experiment, cycling was performed on a conventional LTO cell and a carbon coated LTO cell in accordance with certain embodiments herein. The resulting cycling data (Percent capacity vs. cycle number) is provided in FIG. 12. Notably, the performance of the carbon coated LTO cell, represented by line 1402, is substantially improved compared to the performance of the conventional LTO cell, represented by line 1401. The percent of initial capacity for the carbon coated LTO cell fell more slowly compared to the conventional cell. Furthermore, the carbon coated LTO cell remained functional for more cycles than the conventional cell. This data suggests that the benefit of using carbon coating to reduce gassing and extend cycle life in lithium ion batteries, especially batteries having soft pouch type packaging, is significant.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A method for processing an electrochemically active material for use in a rechargeable cell, the method comprising:
   providing a solution comprising a solvent and a carbon containing precursor;
   dispersing the electrochemically active material in the solution to form a mixture wherein the electrochemically active material is lithium titanium oxide in particulate form prior to dispersing in solution;
   removing the solvent from the mixture to form the electrochemically active material coated with the carbon containing precursor; and
   heating the electrochemically active material coated with the carbon containing precursor in an inert atmosphere at a temperature less than 700° C. to at least partially convert the carbon containing precursor into a carbon coating.

2. The method of claim 1, wherein the average particle size of the electrochemically active material is less than about 1 micrometer.

3. The method of claim 1, wherein a weight ratio of carbon in the carbon containing precursor to the electrochemically active material in the mixture is insufficient to completely cover the electrochemically active material with the carbon coating.

4. The method of claim 1, wherein the carbon containing precursor has a molecular weight of less than about 1000 g/mol.

5. The method of claim 1, wherein the carbon containing precursor comprises a water-soluble polymer.

6. The method of claim 1, wherein the carbon containing precursor comprises a carbohydrate.

7. The method of claim 6, wherein the carbon containing precursor comprises one or more materials selected from the group consisting of sucrose, glucose, and fructose.

8. The method of claim 1, wherein the carbon precursor is selected from the group consisting of fatty acids, glycerol esters, and poly-carboxylic acids.

9. The method of claim 1, wherein the solution comprises one or more solvents selected from the group consisting of water, N-Methyl-2-pyrrolidone, acetone, ethanol, methanol, iso-propanol, and dimethylformamide.

10. The method of claim 1, wherein removing the solvent from the mixture comprises drying at a pressure less than about 760 mmHg.

11. The method of claim 1, wherein the inert atmosphere comprises one or more gases selected from the group consisting of nitrogen, argon, and carbon dioxide.

12. The method of claim 1, further comprising mixing the coated electrochemically active material into a slurry comprising a binder and coating the slurry onto a conductive substrate.

13. The method of claim 12, wherein the slurry is free of conductive additives.

14. The method of claim 1, wherein a weight ratio of carbon in the carbon containing precursor to the electrochemically active material in the mixture is between about 0.1% and 10%.

15. The method of claim 1, wherein a weight ratio of carbon in the carbon containing precursor to the electrochemically active material in the mixture is between about 0.5% and 5%.

16. The method of claim 1, wherein a weight ratio of carbon in the carbon coating to the carbon in the carbon containing precursor is between about 50% and 99%.

17. The method of claim 1, wherein the carbon containing precursor is partially carbonized during heating.

18. A method for processing an electrochemically active material for use in a rechargeable cell, the method comprising:
providing a solution comprising a solvent and a carbon containing precursor, wherein the solvent is water;
dispersing the electrochemically active material in the solution to form a mixture, wherein the electrochemically active material is lithium titanium oxide in particulate form prior to dispersing in solution;
removing the solvent from the mixture to form the electrochemically active material coated with the carbon containing precursor; and
heating the electrochemically active material coated with the carbon containing precursor in an inert atmosphere at a temperature less than 700° to at least partially convert the carbon containing precursor into a carbon coating.

19. The method of claim 18, further comprising dispersing lithium titanium oxide in the solution with a weight ratio of 1:3.665 lithium titanium oxide: solution.

20. The method of claim 18, wherein the inert atmosphere is 99.99% pure Argon gas.

21. A method for processing an electrochemically active material for use in a rechargeable cell, the method comprising:
providing a solution comprising a solvent and a carbon containing precursor, wherein the solvent is ethanol;
dispersing the electrochemically active material in the solution to form a mixture, wherein the electrochemically active material is lithium titanium oxide in particulate form prior to dispersing in solution;
removing the solvent from the mixture to form the electrochemically active material coated with the carbon containing precursor; and
heating the electrochemically active material coated with the carbon containing precursor in an inert atmosphere at a temperature less than 700° to at least partially convert the carbon containing precursor into a carbon coating.

22. The method of claim 21, wherein the carbon containing precursor is butylated hydroxytoluene.

23. The method of claim 22, further comprising adding butylated hydroxytoluene to the solution with a weight ratio of 1:55.38 BHT:Ethanol.

24. The method of claim 1, wherein the solution has a viscosity of less than 100,000 cP.

25. The method of claim 1, wherein the mixture has a viscosity of between about 1000 cP and 100,000 cP.

* * * * *